United States Patent [19]

Gomez

[11] 4,046,105
[45] Sept. 6, 1977

[54] LAMINAR DEEP WAVE GENERATOR

[75] Inventor: Nicolas Gueco Gomez, Cerritos, Calif.

[73] Assignee: Xerox Corporation, Stamford, Conn.

[21] Appl. No.: 587,946

[22] Filed: June 16, 1975

[51] Int. Cl.$^2$ .............................................. B05C 5/02
[52] U.S. Cl. .................................................. 118/429
[58] Field of Search ................. 118/429, 300, 400, 24, 118/25, 410, 660; 228/37, 260

[56] References Cited

U.S. PATENT DOCUMENTS 3,081,535  3/1963  Lincoln .............................. 228/37 X
3,196,829  7/1965  Elliott et al. ......................... 118/300

Primary Examiner—John P. McIntosh

[57] ABSTRACT

For use in soldering the backplanes of printed circuit or other type electronic boards, a solder wave generator is disclosed with opposed side jet walls. The side jet configuration, because of opposed jet flow, provides an inertia necessary to balance the side forces and the pressure developed by the central pool of fluid, in this instance solder. The central pool, as supported by the side flow, is nearly stationary and the width of the pool can be varied substantially without increasing the total flow rate or the head of the pumping system.

6 Claims, 3 Drawing Figures

LAMINAR DEEP WAVE GENERATOR

BACKGROUND OF THE INVENTION

The use of printed circuit boards is becoming universal in almost every electronic field today. With the advent of small, medium, and large scale integrated circuits in conjunction with other circuit items, present day electronic and other type apparatus utilize, with enormous space efficiency, printed circuit boards upon which the components are mounted. Much is known in the art about the use and manufacture of printed circuit boards, but a particular item of concern in this field is the soldering of the components to the electrical circuit paths made of copper or other conducting material on the printed circuit board themselves. It behooves a manufacturer, therefore, of printed circuit boards to find the most efficient manner of soldering these items to the printed circuit board so as to be more effectively cost conscious, provide more throughput on the soldering line, etc. The present invention describes a unique liquid wave generator with an opposed jet flow to provide a stationary, or nearly so, central pool upon which to contact an operating surface, which could be printed circuit board upon which components are to be soldered.

OBJECTS OF THE INVENTION

It is, therefore, an object of the present invention to generate a liquid pool, jet, or wave unsupported by side walls in a laminar wave generator.

It is another object of the present invention to provide an improved solder wave generator for use in soldering components to an electronic printed circuit board.

It is another object of the present invention to provide a solder wave generator with opposed jet flows to provide the inertia necessary to balance the side forces and the pressure developed by the central pool of fluid for use in soldering printed circuit boards.

It is another object of the present invention to provide a solder wave generator with a nearly stationary central pool of solder liquid wherein the width of the pool can be varied substantially without increasing the total flow rate or the head of the pumping system.

SUMMARY OF THE INVENTION

The present application describes a liquid wave generator with a side jet or jets containing a central body of nearly stationary fluid. The hydrostatic pressure exerted by that fluid on the jets causes the jets to turn, i.e., pushes them away. The inertia of the side jets, that is, change in horizontal momentum, balances the side force due to the pressure of the central pool of fluid. With this technique, the width of the wave becomes arbitrary and can be made as large as desired, within normal design specifications, without increasing the total flow rate or the head of the pumping system.

DESCRIPTION OF THE DRAWINGS

For a more complete understanding of the invention, as well as other objects and further features thereof, reference may be had to the following detailed description of the invention in conjunction with the drawings wherein.

DETAILED DESCRIPTION OF THE INVENTION

Typical prior art methods of forming a layer of liquid include U.S. Pat. No. 3,256,855 wherein opposite moving rollers create a standing wave of the liquid which projects above the tops of the opposite by moving rollers. U.S. Pat. No. 3,664,298 discloses an elongated manifold wherein the liquid is pumped through an exit slit to form a bead, or reservoir, on the top surface thereof where the liquid then flows over the edges. Ridges along the edges cause the liquid to flow essentially in directions substantially perpendicular to the exit slit to provide an even application of the liquid U.S. Pat. No. 3,752,119 discloses the use of angled side walls to maintain a pool of liquid for application to another member. The control of the height of the liquid pool formed above the distributor can be done by use of end plates selected in relation to the rate of flow of liquid to the pool.

Figure 1:
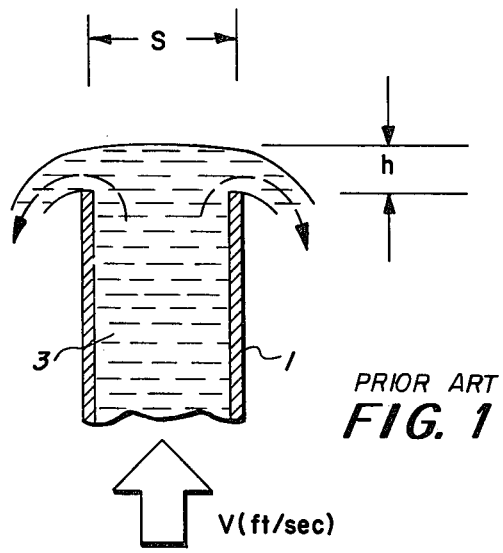
FIG. 1 depicts a prior art liquid flow generator with a straight vertical jet.

A typical straight vertical jet such as used in many current designs may be seen in conjunction with FIG. 1. The vertical pipe or other type of arrangement contains the liquid 3 which is forced up through the container 1 over the top edges of the side members. In order to lift the fluid to a height h above the lip of the duct 1, the jet velocity V, with a width S of the duct itself, must be at least (at the center line thereof):

$$V = \sqrt{2gh}$$

If, for instance, $h$ is 0.75 inches (0.0625 feet) and $g = 32.2$ feet/second/second, the above formula determines that the velocity of the fluid must be approximately 2.0 feet per second. The volume outflow across the exit section with $S = 4$ inches (0.333 feet) and an estimated length of the unit at 24 inches, is then $Q = 1SV = 1.33$ feet$^3$ per second $= 80$ feet$^3$ per minute $= 600$ gallons per minute.

The present invention, however, provides for superior performance but at a considerable reduction in required flow rate as will be hereinafter disclosed.

Figure 2:
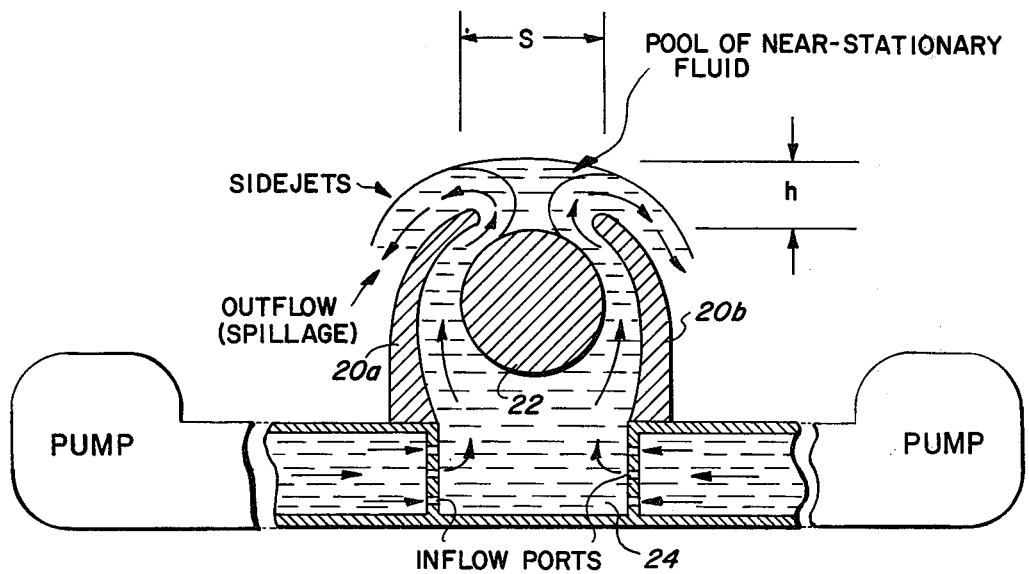
FIG. 2 shows the design of the present invention with side jets of liquid flow causing a pool of near stationary fluid.

In order to provide for soldering of backplanes of printed circuit boards, for example, or for other applications, it is necessary to keep a body of liquid standing higher than any solid boundaries. Therefore, the liquid must either be projected upwards, as in the vertical jet design described hereinabove, or it must be contained by fluid side jets in such a way that the pressure can be resisted by the side jets. FIG. 2 shows an embodiment showing the side jet configuration. By the use of a pump or dual pumps as schematically indicated or other motive force (not shown) to the liquid 24, the liquid is caused to impinge upon the cylindrical member 22 which divides the flow of liquid into two paths which are indicated as "inflow ports" on FIG. 2. The flow of the liquid is constricted by side jet support members 20a and 20b which causes the liquid to flow in the direction of the arrows, as shown. As the liquid reaches the uppermost parts of the side jet support members 20a and 20b, the liquid flows out over the top and down to a sump due to the force of gravity. Thus, can be seen the two side jets of liquid pouring over into the outflow or spillage area of the side jet support members. Central between the two side jet support members is the central pool of nearly stationary fluid as indicated in FIG. 2. The hydrostatic pressure exerted by that fluid on the jets causes the jets to turn, i.e., pushes away, from each other. The inertia of the side jets, change in horizontal momentum, balances the side force due to the pressure of the central pool of fluid. The width of the wave, S, is arbitrary, within gross limits, and can be made as large as desired without increasing the total flow rate or the head of the pumping system. The flow of solder in FIG. 2 being minimized, as described, the oxidation or formation of dross is, accordingly, minimized. This is highly desirable in that the formation of dross is a problem continually addressed by the industry.

The side jets are subject to certain requirements which, in essence, specify the volume flow, the mass of the retaining fluid wall, and/or the velocity necessary for the jets to be ale to support the pressure of the central pool of liquid. An analysis shows that to maintain a fixed height 1 of the wave, a certain flow Q must be supplied at a given velocity V1 of the jets. An increase in V1 is associated with a reduction in Q. The smoothness of the wave depends primarily on the jet velocity, i.e., the higher V, the more likely the flow to be rough. To compare it with the vertical jet embodiment set forth above with relation to FIG. 1, the velocity, for purposes of comparison, will be set at V$l$ = 2 feet per second. Utilizing the formula an analysis of this configuration would show that the total flow Q required to maintain a height $h$ of 0.75 inches in the configuration shown in FIG. 2 is approximately Q = 40 gallons per minute. This factor of 40 gallons per minute should be compared with the 600 gallons per minute required in the prior art vertical jet design discussed above in relation to FIG. 1. While Q in this configuration does not change as the width of the wave is increased, in practice it would be expected that if the width s is increased too much the central portion of the wave would begin to cave in. The experiments that were conducted were aimed primarily at determining the maximum jet velocity V1 which yields smooth flow. It was found that for best results V1 would be less than 1.5 feet per second which raises the minimum flow required to at least Q = 60 gallons per minute.

Figure 3:
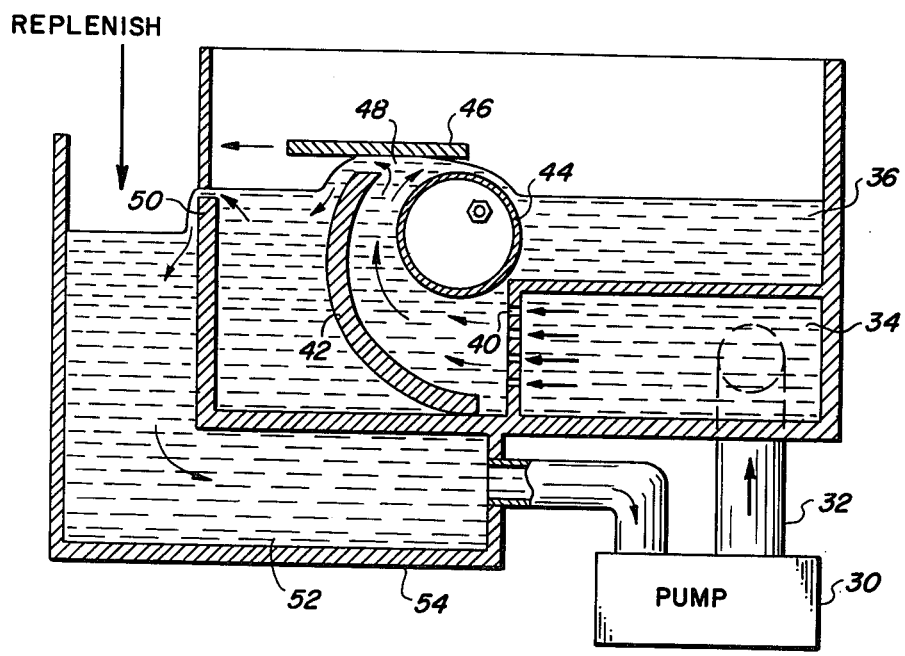
FIG. 3 is an embodiment leading to the system set forth in FIG. 2 with a side jet of liquid providing a near stationary pool of fluid.

FIG. 3 shows an actual working embodiment of the present invention utilizing a single jet to exhibit the qualities of the double jet configuration of FIG. 2. Pump 30, of any conventional design, would pump liquid 52 from the sump area 54 into area 34 via a pipe or other type conduit 32. The liquid would then be forced out through orifices 40 into an area between outer cylinder 42 and inner cylinder 44. As the liquid reaches the top area defind by the upper edges of outer cylinder 42 and the upper surface of inner cylinder 44, the liquid would flow out to the left over said top edge of outer cylinder 42. Some liquid would also flow over the top edge of inner cylinder 44. At the area defined by designation 48, would be the essentially stationary wave formed by the side walls of the liquid as determined by the upper edge of outer cylinder 42 and the upper surface of inner cylinder 44. The excess liquid would then flow over edge 50 of container 36 back into the sump area 52. Article 46 could be a printed circuit board which would be moved over and in contact with the upper surface of the stationary wave at 48 in any manner known in the prior art. The lower surface of printed circuit board 46 would then be soldered in order to complete the circuits between the circuit elements and the printed conductors. Of course, designation 46 could be any component which necessitates the use of a stationary wave impinging upon the lower edge of the item. In the embodiment shown in FIG. 3, the outer cylinder could have a diameter of eight inches while the inner cylinder could have a diameter of, say, four inches. In this instance, liquid 52 would comprise a hot soldering liquid for use when soldering the backplane of a printed circuit board. The technique disclosed in FIG. 3 can, of course, be utilized in the double jet configuration embodiment of FIG. 2.

Thus, while the invention has been described with reference to specific embodiments, it will be understood by those skilled in the art that various changes may be made and equivalents may be substituted for elements thereof, without departing from the true spirit and scope of the invention. In addition, many modifications may be made to adapt to a particular situation without departing from the essential teachings of the invention.

What is claimed is:

1. Apparatus for generating a near stationary central pool of liquid in a wave generator comprising
   means for imparting a motive force to a liquid,
   a first generally cylindrical support means positioned transverse to the flow of the liquid for dividing the moving flow of liquid,
   a vertically disposed conduit means for constraining the flow of liquid to the shape of said first support means so as to generate first and second side jets of liquid, said conduit means being higher at the upper extremities thereof than the first support means and spaced apart from said first support means to form an opening for the outflow of said liquid, said liquid flowing out and over the sides of said conduit means due to the force of gravity, the pool of liquid formed at the center of the outflow opening being nearly stationary.

2. The laminar deep wave generator as set forth in claim 1, wherein said imparting means comprises a single pump for supplying said liquid to said first support means.

3. The laminar deep wave generator as set forth in claim 1, wherein said imparting means comprises at least two pumps for supplying said liquid to said support means, each pump being utilized for the overflow of said liquid from said vertically disposed means, respectively.

4. A laminar deep wave generator comprising:
   a vertically disposed conduit means for liquid flow;
   a body of generally cylindrical cross-section disposed within the exit end of and transversely to said conduit, the conduit wall being relatively closely spaced from the associated portions of said body, and generally arcuately conforming to said portions and extending beyond said body;
   means to establish an upwardly directed liquid flow against said body to cause said liquid flow to split into inwardly directed jets to create a substantially stationary central pool of liquid at said exit.

5. In a device for applying fluid solder flux to the underside of a substrate the combination comprising:
   a vertically disposed conduit means for fluid solder flux flow;
   a body of generally cylindrical cross-section disposed within the exit end of and transversely to said conduit, the conduit wall being relatively closely spaced from the associated portions of said body, and generally arcuately conforming to said portions and extending beyond said body;

eans to establish an upwardly directed fluid solder flux flow against said body to cause said flux flow to split into inwardly directed jets to create a substantially stationary central pool of fluid solder flux at said exit where said substrate may be operatively associated with said pool.

6. The device of claim 5 wherein said substrate is a printed circuit board.

* * * * *